M. MAYO.
DIRIGIBLE HEADLIGHT.
APPLICATION FILED OCT. 22, 1910.
981,449.
Patented Jan. 10, 1911.
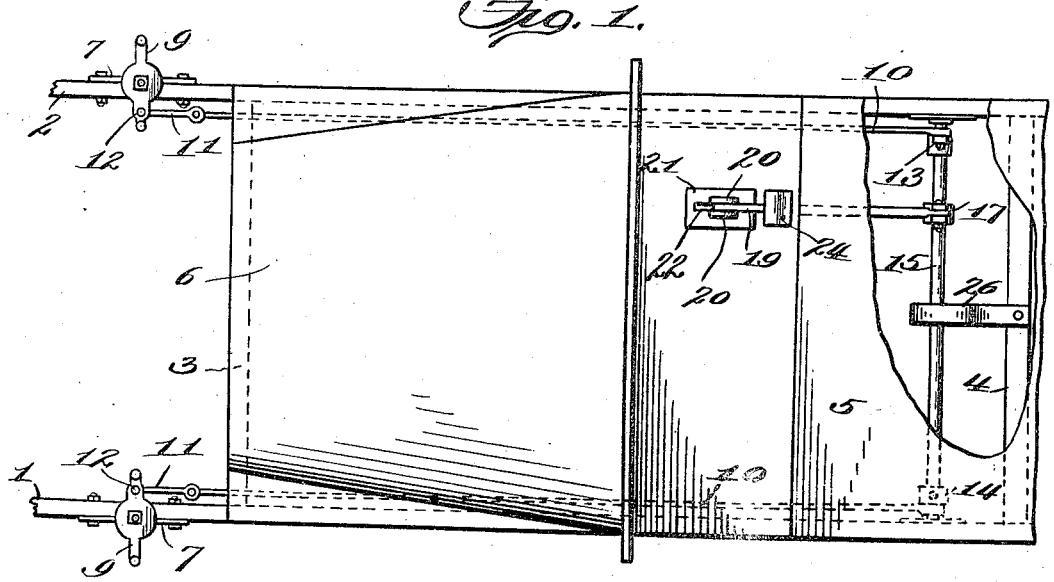
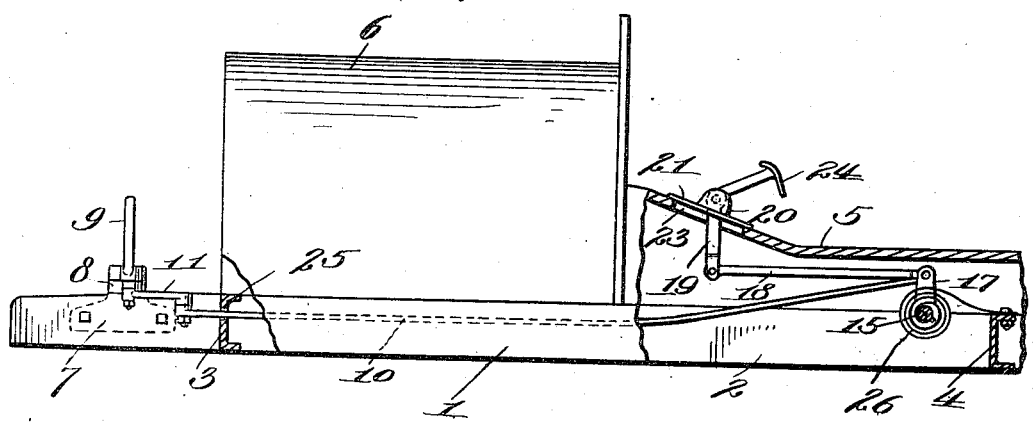
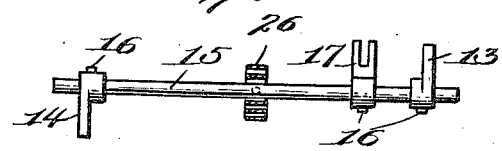
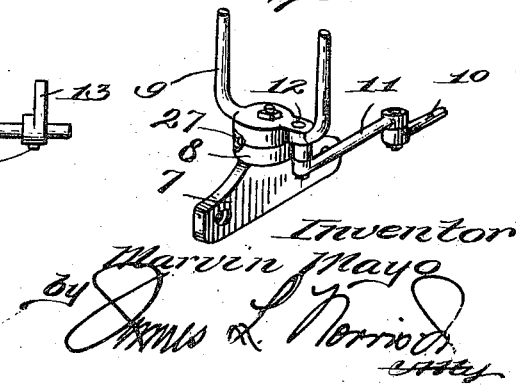
Witnesses:
Inventor
Marvin Mayo

UNITED STATES PATENT OFFICE.

MARVIN MAYO, OF HUNTSVILLE, MISSOURI.

DIRIGIBLE HEADLIGHT.

981,449.  Specification of Letters Patent.  Patented Jan. 10, 1911.

Application filed October 22, 1910. Serial No. 588,546.

*To all whom it may concern:*

Be it known that I, MARVIN MAYO, a citizen of the United States, residing at Huntsville, in the county of Randolph and State of Missouri, have invented new and useful Improvements in Dirigible Headlights, of which the following is a specification.

The present invention has reference to dirigible headlights for vehicles. Its object, stated broadly, comprehends essentially an improved construction designed primarily for motor cars and embodying a pair of pivotally mounted lamp brackets located at the front end of the car and having individual connections with a pedal-actuated rock shaft, the arrangement being such that the shaft in question may be rocked in either direction, so as to throw the light from both lamps at one side or the other of the road, as circumstances may require, means being provided, however, for normally maintaining the light beams in parallelism with the longitudinal axis of the car.

A structural embodiment of the invention is illustrated in the accompanying drawing, wherein—

Figure 1 is a plan view, showing the application of said invention. Fig. 2 is a side elevation of Fig. 1, with parts in section. Fig. 3 is a detail view of the rock shaft and the parts connected thereto. Fig. 4 is a perspective view of one of the lamp brackets and its support.

In said drawings, 1 and 2 indicate the two side beams, and 3 and 4 the front and intermediate cross-beams of the frame of a car of conventional type, and 5 the front portion of the floor of the car.

Adjacent the front end of each beam, and in advance of the hood 6, there is bolted or otherwise secured a metal plate 7 arranged, in the present instance, against the outer face of the beam and formed at its upper edge with a lip 8 which projects laterally across the top of the beam and constitutes a support for the lamp bracket 9. Said brackets are preferably of the well-known fork type, and their bases rest upon and are suitably pivoted to the plate lips. These brackets are connected with a pair of operating rods 10 arranged longitudinally of the car frame and extending beneath the floor and the hood, as shown in Fig. 2, whereby they are concealed and their interference with the driving and transmission mechanisms prevented. The front ends of said rods are pivotally connected to the rear ends of a pair of links 11, the front ends of which links are fastened to depending pivot pins 12 secured to the inner ends of the bracket bases. To actuate said operating rods, their rear ends are pivoted to a pair of oppositely-extending crank arms 13 and 14 mounted on a transversely-arranged rock shaft 15 that is located in front of the cross-beam 4 and is suitably supported at its ends by the side beams 1 and 2. The arms 13 and 14 are adjustable on the rock shaft, and are designed to be held in the desired position by means of set screws 16 or the like. There is also mounted in a similar manner on said shaft a third crank arm 17 provided with a bifurcated outer end wherein is pivotally secured the rear end of a pitman 18 that extends forwardly from the shaft and is pivoted at its front end to the lower end of a pedal lever 19. This pedal is preferably of the bell-crank type and is pivotally mounted at the intersection of its two arms between a pair of ears 20 formed upon a plate 21 secured to the usual inclined portion of the floor. Said plate is provided with a longitudinal slot 22 which registers with a similar slot 23 in the floor, as will be understood, the lower arm of the pedal extending through said slots. The upper or outer pedal arm extends upwardly and rearwardly toward the driver's seat, (not shown), and its foot plate 24 is so curved as to admit of the pedal being readily rocked in either direction. The forward ends of the operating rods pass through slots 25 in the front cross-beam 3.

Means is provided for normally holding the rock shaft in a neutral position, *i. e.*, in such a position that the beams of light from the two lamps mounted on the brackets 9 will parallel the longitudinal axis of the car, or, in other words, will be cast straight ahead of the car. In the construction illustrated, such means is associated with the rock shaft and is constituted by a leaf spring 26 coiled around said shaft and connected to the same at its inner end, its outer end being fastened to beam 4.

The operation of the invention will be readily apparent from the foregoing, and is substantially as follows: Movement of the pedal, either forward or backward, will produce rotation of the rock shaft, and, in consequence, will effect an endwise movement of the operating rods in opposite directions.

Movement of said rods will, in turn, have the effect of swinging the lamp brackets upon their bases, by reason of the link connections between said brackets and rods. It will be seen, therefore, that both lamps may be simultaneously turned in either direction, so as to cast their beams in any desired direction and at any desired angle with respect to the longitudinal axis of the car, the lamps being returned automatically to their normal position by the spring 26, as soon as the pressure upon the pedal is removed.

The device, as a whole, is certain and positive in its operation, and consists of but few parts, and those of the simplest character, by reason of which fact it may be constructed at an extremely low cost. It may be readily applied to any standard make of car without occasioning re-arrangement of the mechanism thereof, and when in place will not interfere with the operation of such mechanism. Finally, it is practically entirely concealed, and, hence, cannot of itself render the appearance of the car unsightly. Between the bases of the lamp brackets and the plate lips, a series of anti-friction bearings 27 may be interposed.

I claim as my invention:

1. The combination, with the frame and floor of a car; of a rock shaft arranged transversely of the frame and below the floor; a lamp bracket pivotally supported at the front end of each of the side beams of said frame; a pedal for rocking said shaft in either direction; and a separate connection between each bracket and the shaft, for turning both lamps simultaneously in the same direction when said shaft is rocked.

2. The combination, with the frame and floor of a car; of a rock shaft arranged transversely of the frame and below the floor; a lamp bracket pivotally supported at the front end of each of the side beams of said frame; a pedal for rocking said shaft in either direction; a pair of links pivotally connected to said brackets; a pair of oppositely-disposed cranks secured to said shaft; and a pair of longitudinal operating rods pivotally connected at their rear ends to said cranks and at their front ends to said links, for turning both lamps simultaneously in the same direction when said shaft is rocked.

3. The combination, with the frame and floor of a car; of a rock shaft arranged transversely of the frame and below the floor; a lamp bracket pivotally supported at the front end of each of the side beams of said frame; a pedal pivoted to said floor; a crank secured to said shaft; a pitman connecting said crank and said pedal; a pair of oppositely-disposed additional cranks secured to said shaft; and a separate connection between each additional crank and the corresponding bracket.

4. The combination, with the frame and floor of a car; of a rock shaft arranged transversely of the frame and below the floor; a lamp bracket pivotally supported at the front end of each of the side beams of said frame; a pedal for rocking said shaft in either direction; a separate connection between each bracket and the shaft, for turning both lamps simultaneously in the same direction when said shaft is rocked; and a spring connected with said shaft for normally holding the same in neutral position.

5. The combination, with the frame and floor of a car, said frame including side beams and connecting cross-beams; of a rock shaft arranged below the floor; a lamp bracket pivotally supported upon each side beam; means for rocking said shaft; a separate connection between each bracket and the shaft, for turning both lamps simultaneously in the same direction when said shaft is rocked; and a spring coiled about said shaft and connected at one end thereto and at the other end to one of said cross-beams, for normally holding the shaft in neutral position.

In testimony whereof I have hereunto set my hand in presence of two subscribing witnesses.

MARVIN MAYO.

Witnesses:
A. H. BROADDUS,
W. M. EVANS.